(12) United States Patent
Ninan

(10) Patent No.: US 9,864,232 B2
(45) Date of Patent: Jan. 9, 2018

(54) LIGHT DIRECTED MODULATION DISPLAYS

(71) Applicant: DOLBY LABORATORIES LICENSING CORPORATION, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 332 days.

(21) Appl. No.: 14/419,623

(22) PCT Filed: Aug. 5, 2013

(86) PCT No.: PCT/US2013/053597
§ 371 (c)(1),
(2) Date: Feb. 4, 2015

(87) PCT Pub. No.: WO2014/025677
PCT Pub. Date: Feb. 13, 2014

(65) Prior Publication Data
US 2015/0227003 A1   Aug. 13, 2015

Related U.S. Application Data

(60) Provisional application No. 61/681,870, filed on Aug. 10, 2012.

(51) Int. Cl.
*G02B 26/00* (2006.01)
*G02F 1/00* (2006.01)
(Continued)

(52) U.S. Cl.
CPC .......... *G02F 1/133605* (2013.01); *G02F 1/01* (2013.01); *G02F 1/0121* (2013.01);
(Continued)

(58) Field of Classification Search
CPC .............. G02B 26/0833; G02B 26/001; G02B 26/0841; G02B 27/48; G02B 1/04; B82Y 20/00
(Continued)

(56) References Cited

U.S. PATENT DOCUMENTS 6,741,304 B2    5/2004   Nauta
7,152,988 B2   12/2006   Hung
(Continued)

FOREIGN PATENT DOCUMENTS

CN         1524196       8/2004
CN       101057162      10/2007
(Continued)

OTHER PUBLICATIONS

Shimizu et al, Machine translation of JP 2008257267 A, dated Oct. 23, 2008.*

*Primary Examiner* — Bumsuk Won
*Assistant Examiner* — Tamara Y Washington

(57) ABSTRACT

A light source includes a light reflector and multi-pixel light modulators. The light reflector is surrounded with reflective surfaces. Light can be injected into the light reflector and diffused throughout the light reflector. The multi-pixel light modulators have individual transmittance states based on image data to modulate light that illuminates multi-pixel portions of a light receiving surface.

34 Claims, 11 Drawing Sheets

(51) Int. Cl.
*G02F 1/1335* (2006.01)
*G09G 3/34* (2006.01)
*G02F 1/01* (2006.01)

(52) U.S. Cl.
CPC ... *G09G 3/3426* (2013.01); *G09G 2320/0646* (2013.01); *G09G 2330/021* (2013.01); *G09G 2360/16* (2013.01)

(58) Field of Classification Search
USPC ............................... 359/237, 483.01–494.01
See application file for complete search history.

(56) References Cited

U.S. PATENT DOCUMENTS

| | | | |
|---|---|---|---|
| 7,417,782 B2 | 8/2008 | Hagood | |
| 7,447,417 B2 | 11/2008 | Uemoto | |
| 7,995,261 B2 | 8/2011 | Pakhchyan | |
| 7,999,994 B2 | 8/2011 | Hagood | |
| 8,471,807 B2 | 6/2013 | Seetzen | |
| 2008/0116468 A1 | 5/2008 | Radkov | |
| 2010/0007854 A1* | 1/2010 | Tanaka | G03B 21/2013 353/30 |
| 2010/0157406 A1* | 6/2010 | Gruhlke | G02B 26/001 359/238 |
| 2011/0043882 A1 | 2/2011 | Yoon | |

FOREIGN PATENT DOCUMENTS

| | | |
|---|---|---|
| CN | 102483544 | 5/2012 |
| JP | 09-080432 | 3/1997 |
| JP | 2002-062853 | 2/2002 |
| JP | 2008-257267 | 10/2008 |
| KR | 10-2010-0110808 | 10/2010 |
| WO | 02/21198 | 3/2002 |
| WO | 2008/092276 | 8/2008 |
| WO | 2012/064562 | 5/2012 |
| WO | 2012/067838 | 5/2012 |

\* cited by examiner

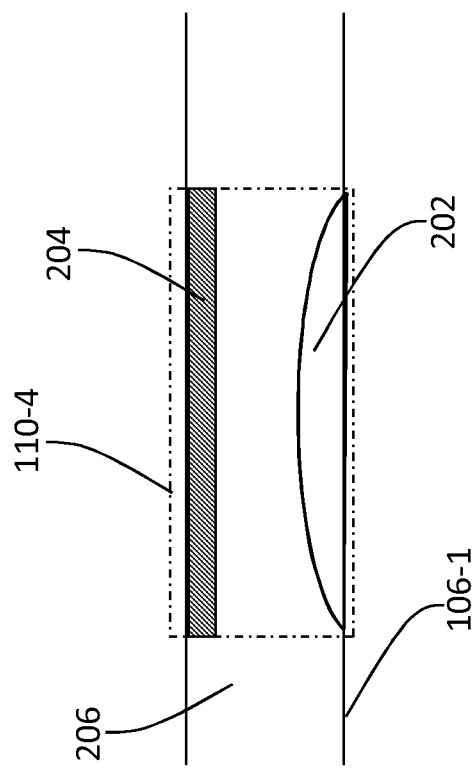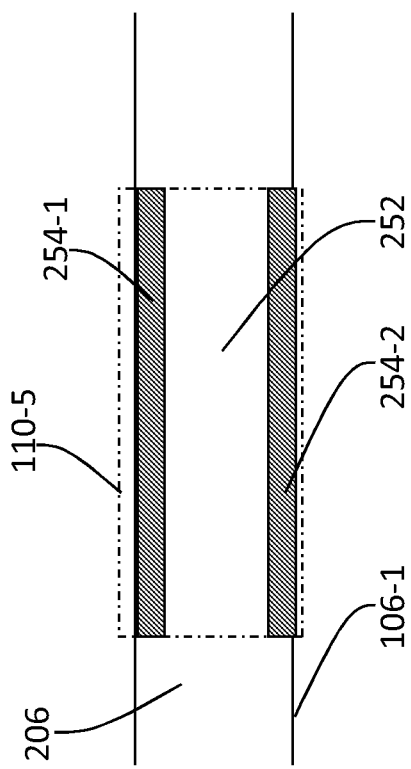

| Transmittance States | Shutter States | Transmittance Levels |
|---|---|---|
| 0 | Off | |
| 1 | On | Level 1 |
| 2 | On | Level 2 |
| ... | On | ... |

FIG. 3 receive image data for one or more images to be rendered in a display system, a light source of the display system having a light reflector comprising one or more light reflective surfaces and a plurality of multi-pixel light modulators 702 set, based on the image data, the plurality of multi-pixel light modulators to individual transmittance states to modulate light (a) exiting from the light reflector and (b) illuminating individual multi-pixel portions of a light receiving surface 704

FIG. 7

LIGHT DIRECTED MODULATION DISPLAYS

CROSS-REFERENCE TO RELATED APPLICATIONS

This application claims priority to U.S. Provisional Patent Application No. 61/681,870 filed 10 Aug. 2012, which is hereby incorporated by reference in its entirety. TECHNOLOGY The present invention relates generally to display systems, and in particular, to light sources in display systems that comprise two or more levels of light modulations.

BACKGROUND

A dual modulation display provides increased local peak brightness and reduced overall brightness. Each pixel of the display can have high peak brightness, e.g., 400-1000 nits or even more. However, most pixels during a display operation may only need to be rendered at a much lower brightness, e.g., 100 nits or even less. A display, capable of generating 400-1000 nits across the full screen, unnecessarily employs expensive components for each pixel to achieve high local peak brightness, and generates an excessive amount of heat from underutilized, over-provisioned optical energy.

Small display systems such as mobile devices may not have sufficient room to install a large number of active light emitting elements. However, a low-fill factor single board capable of providing relatively uniform full screen lighting may be costly to make or install, especially in a small form factor device in which space availability is at a premium. Further, multiple low-fill factor lighting modules assembled together for full screen lighting often exhibit undesirable visual artifacts such as visually perceptible lines, shadows and non-uniformity in the border regions of the multiple lighting modules and/or in other regions such as occupied by on-board circuitry. Additional components such as light diffusers can be installed to ameliorate or reduce the undesirable visual artifacts, thereby leading to larger and heavier form factors for mobile devices.

The approaches described in this section are approaches that could be pursued, but not necessarily approaches that have been previously conceived or pursued by others. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A and FIG. 2B illustrate example multi-pixel light modulators, in accordance with an embodiment;

FIG. 3 illustrates example transmittance states comprising various combinations of shutter states and transmittance levels, in accordance with an embodiment;

FIG. 7 illustrates an example process flow, in accordance with an embodiment of the present invention.

DESCRIPTION OF EXAMPLE EMBODIMENTS

Figure 1A:
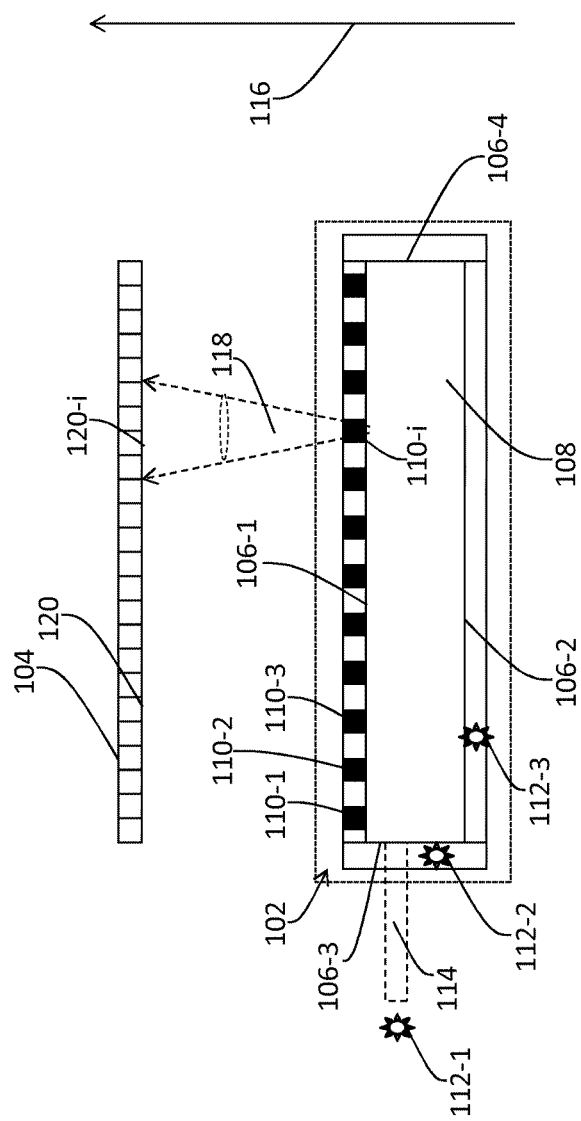
FIG. 1A through FIG. 1D illustrate example light source configurations, in accordance with an embodiment.

Example embodiments, which relate to light directed modulation techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. EXAMPLE LIGHT SOURCE
3. MULTI-PIXEL LIGHT MODULATORS
4. TRANSMITTANCE STATES
5. LIGHT DIRECTED MODULATION
6. FILL FACTORS
7. MODULAR CONFIGURATIONS
8. EXAMPLE DISPLAY SYSTEM
9. EXAMPLE PROCESS FLOW
10. IMPLEMENTATION MECHANISMS—HARDWARE OVERVIEW
11. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, light is reflected, recycled, and diffused within a light reflector. The light reflector can be an optical cavity or a light guide walled by one or more reflective surfaces or, alternatively, substantially surrounded. The one or more reflective surfaces can be highly reflective. Thus, light is not wasted for any non-bright image features, but rather recycled, for example, until the light exits to illuminate other image features including any bright image feature(s).

The light source may be configured to illuminate a light receiving surface (of a display panel, an intermediate light modulation layer, a light diffuser, etc.) with different light intensities in different portions of the light receiving surface. The light source comprises a plurality of multi-pixel light modulators and a light reflector (e.g., a cavity with total internal reflection (TIR) surfaces, an optical light guide with reflective surfaces, etc.) so that light can be recycled inside the light reflector until exiting through the multi-pixel light modulators to illuminate different portions of the light receiving surface with different light intensities.

The area and size of illumination on the light receiving surface from a multi-pixel light modulator can be controlled by lens elements, lens arrays, light focusing components, light diffusion components, or other suitable optical light directing components that may be placed on top of the multi-pixel light modulators. Since the light is diffused throughout the light reflector of the light source, and since light from multi-pixel light modulators may be shaped by various mechanical (e.g., aperture, shutter, etc.), electrical (e.g., switching elements, liquid crystal state, etc.), and optical components (e.g., lens elements, etc.), a large fill factor active light emitter configuration is not necessary for a light source under the techniques as described herein.

In an embodiment, light exits at points controlled by the multi-pixel light modulators, which allows transmittance states of the multi-pixel light modulators to be controlled based on image data to produce peak brightness for a portion of the light receiving surface that corresponds to one or more pixels of a bright image feature as needed. The light from the light source may be further modulated by additional modulation layers of various spatial resolutions in order to render (e.g., high resolution, high dynamic range, wide color gamut) images to be viewed by a user.

Light from two or more multi-pixel light modulators may overlap. Brightness of illumination on a portion of the light receiving surface can be determined by the number of multi-pixel light modulator illuminating light on the portion and transmittance levels of the multi-pixel light modulators. For example, a light source that is capable of producing 1000 nits of light may be configured to render a 1000 nit single bright feature on the display panel or 10 nits full screen on the display panel if the display panel comprises 100 pixel blocks each of which receives an equal amount of light illumination. This exemplary light source can be configured to render any combination of brightness about the display panel totaling approximately 1000 nits at any one time (e.g., pixel at 500 nits, another pixel 206 nits, and 98 pixels at 3 nits each, collectively 1000 nits).

In some embodiments, mechanisms as described herein form a part of an image processing system, including but not limited to: a display system, a server, studio system, art director system, image editor, color grading or mastering tool, professional reference monitor, animation system, movie studio system, theater systems, cameras, TVs, broadcast system, media recording device, media playing device, video projector, screen (e.g., matte screen, gray screen, silver screen, lenticular screen or the like), laptop computer, netbook computer, tablet computer, cellular radiotelephone, electronic book reader, point of sale terminal, desktop computer, computer workstation, computer kiosk, or various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. EXAMPLE LIGHT SOURCE

FIG. 1A illustrates an example light source (102) comprising a plurality of multi-pixel light modulators (e.g., 110-1, 110-2, 110-3, ..., 110-i, ..., etc.) and a light reflector (108), in accordance with an example embodiment. The light reflector (108) comprises one or more light reflective components having one or more light reflective surfaces (e.g., 106-1 through 106-4). For the purpose of illustration only, FIG. 1A depicts the light source (102) as having a rectangular shape. In various embodiments, the light source (102) may be of any geometric shape including but not limited to any of rectangular shapes, polygonal shapes, curved shapes, spherical shapes, concave shapes, convex shapes, irregular shapes, disjoint shapes, etc.

The light reflector (108) may comprise a light recycling region, surrounded (not necessarily completely) by the light reflective surfaces (106-1 through 106-4). Light that has not exited the plurality of light modulation units can be recycled within the light recycling region. The light recycling region may comprise optical cavities, air gaps, light guides, optical transparent materials, etc., that are configured to retain, preserve, or even regenerate light in the light reflector (102). In some embodiments, light conversion materials such as quantum dots are disposed in the interior of an optical component, at or near a surface of an optical component, etc., to regenerate light of various possible colors and wavelength ranges to be emitted out of the multi-pixel light modulators of the light source (102).

The light reflective surfaces (106-1 through 106-4), which may be highly reflective (e.g., 80%, 85%, 90%, 95%, 99%, 99.9%, etc.), can be implemented with reflective metallic surfaces, total internal reflection (TIR) surfaces, substrates, optical films, optical reflective enhancement films, reflective LCD layers (whose reflectivity may be based on a liquid crystal state), e-paper, other light reflective materials, etc. Additionally, optionally, or alternatively, the light reflective surfaces (106-1 through 106-4) can comprise spatial features, enhancement structures, enhancement materials, light directing features, light diffusing features, light focusing features, etc., that are configured to distribute, diffuse, or direct, light throughout the light recycling region and/or to the multi-pixel light modulators (110-1, 110-2, 110-3, ..., 110-i, ..., etc.).

Light recycled within the light reflector (108) and emitted through the multi-pixel light modulators of the light source (102) can be sourced from or injected by one or more active light emitters that may or may not be located within the light source (102). As used herein, an active light emitter may refer to a light emitter that injects (visible or invisible) light into a light source or a light reflector therein. Active light emitters (e.g., one of which is 112-1 in FIG. 1A) may be located external to the light source (102); light from the external active light emitter (112-1) may be optically guided or directed into the light reflector (108) of the light source (102) with a light guiding/directing mechanism (114) such as one or more of optical fibers, light guide, etc.

Active light emitters (e.g., 112-2 and 112-3) may also be internal to (e.g., located internally in) the light source (102); light from the internal active light emitters (112-2 and 112-3) may be injected into the light reflector (108) of the light source (102) from their locations on one or more of the light reflective surfaces (106-1 through 106-4).

In some embodiments, the plurality of multi-pixel light modulators (**110-1, 110-2, 110-3, . . . , 110-*i*, . . . , etc.) is embedded in one or more light reflective components having the light reflective surfaces (106-1 through 106-4) of the light source (102). For example, the plurality of multi-pixel light modulators (110-1, 110-2, 110-3, . . . , 110-*i*, . . . , etc.) can be embedded in the light reflective component having the reflective surface 106-1 as illustrated in FIG. 1A. The plurality of multi-pixel light modulators (110-1, 110-2, 110-3, . . . , 110-*i*, . . . ,** etc.) may form a pattern on a light reflective surface of any regular or irregular form including but not limited to any of: rectangular forms, polygonal forms, curved forms, spherical forms, etc.

A light source (102) can be used as a backlight, a side-lit (or edge lit) light source, a front light, etc. Light exiting from the plurality of multi-pixel light modulators (**110-1, 110-2, 110-3, . . . , 110-*i*, . . . , etc.) can be configured to illuminate a display component (104) having a light receiving surface (120) in a display system. Examples of display components having a light receiving surface irradiated with light from light sources as described herein may include, but are not limited to any of: light modulation layers, light diffusers, light guides, display panels having image rendering surfaces viewable by a user, etc. The light receiving surface (120) can be configured to receive the light from the plurality of multi-pixel light modulators (110-1, 110-2, 110-3, . . . , 110-*i*, . . . , etc.). As illustrated in FIG. 1A, light (118) exiting from the multi-pixel light modulator (110-*i*) can be configured to illuminate a multi-pixel portion (120-*i*) of the light receiving surface (120). In an example embodiment, the multi-pixel portion (120-*i*) corresponds to multiple pixels of a display panel, as viewed by a user located at a location pointed to by an axis (116**).

Figure 1B:
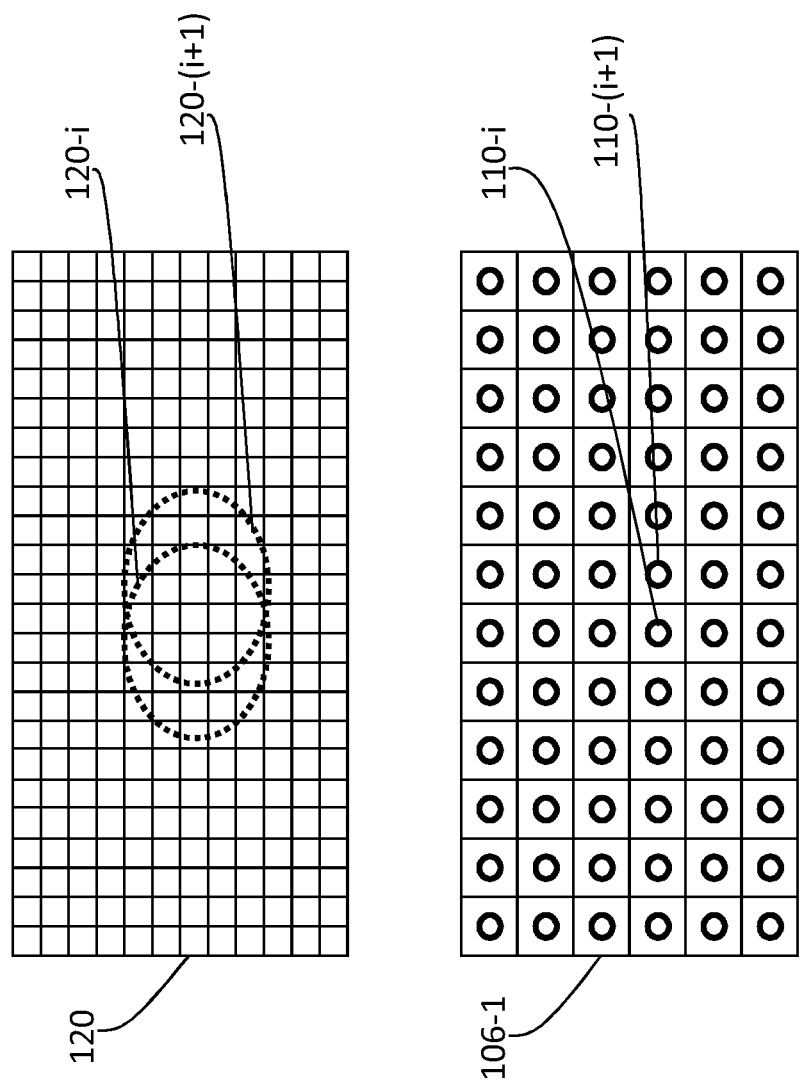

FIG. 1B illustrates example multi-pixel portions (e.g., **120-*i* and 120-(*i*+1)) on a light receiving surface (e.g., 120), in accordance with an embodiment. As illustrated, a multi-pixel light modulator (e.g., 110-*i*) embedded with a light reflective surface (e.g., 106-1) of a light source (e.g., 102 of FIG. 1A) can be configured to direct light from the light reflector (108) of the light source (102) to a multi-pixel portion (e.g., 120-*i*), when the multi-pixel light modulator (110-*i*) is set to a non-dark state. In some implementations, the size and shape of the multi-pixel portion (120-*i*) as illuminated by the multi-pixel light modulator (110-*i*) can be constant. In some other implementations, the size, the shape, the intensity distribution, etc. of the multi-pixel portion (120-*i*) as illuminated by the multi-pixel light modulator (110-*i*) can vary by a control mechanism that controls the operation of the multi-pixel light modulator (110-*i***).

In some embodiments, a portion of a light receiving surface (e.g., 120) illuminated by a light source (e.g., 102) as described herein can be illuminated by more than one multi-pixel light modulators, and hence can concurrently belong to more than one multi-pixel portions (e.g., **120-*i*, 120-(*i*+1), etc.). For example, a second multi-pixel light modulator (e.g., 110-(*i*+1)) embedded with the light reflective surface (106-1) of the light source (102 of FIG. 1A) can be configured to direct light from the light source (102) to a second multi-pixel portion (120-(*i*+1)), when the multi-pixel light modulator (110-(*i*+1)) is set to a non-dark state. The intersection of the first multi-pixel portion (120-*i*) and the second multi-pixel portion (120-(*i*+1)) is a portion of the receiving surface (120**) that simultaneously belongs to both multi-pixel portions.

3. MULTI-PIXEL LIGHT MODULATORS

A multi-pixel light modulator may comprise an optical shutter (e.g., a micro device). A micro-electro-mechanical system (MEMS) control mechanism can be used to control or set an aperture value among one or more possible aperture values for the optical shutter. The area of illumination on a separate modulation layer, the amount of light on individual pixels and the number of illuminated pixels can be variably controlled by setting different aperture values. For example, dim light can be created with a small aperture value, while bright light can be created with a large aperture value.

A multi-pixel light modulator may comprise one or more lens elements (e.g., micro lenses, which may or may not be a part of a micro lens array). The lens elements may have a fixed focal length. Alternatively, the focal length of the lens can be variable, and can be controlled by a MEMS control mechanism to take any focal length value in a set of different focal length values. The area illuminated on a light receiving surface (e.g., 120), the amount of light on individual pixels, and the number of illuminated pixels, by the multi-pixel light modulator may be variably controlled or adjusted with different focal length values.

A pulse-width-modulation (PWM) mechanism can be configured with a multi-pixel light modulator to control time duration in which the multi-pixel light modulator is in a particular transmittance state. For example, to create a 250 nits illumination in an image frame time (e.g., $\frac{1}{12}$ second, $\frac{1}{24}$ second, $\frac{1}{60}$ second, $\frac{1}{120}$ second, $\frac{1}{240}$ second, etc.), the PWM mechanism can be controlled to transmit 500 nits through the multi-pixel light modulator during one half of the time in the image frame time (e.g., half of $\frac{1}{12}$ second, $\frac{1}{24}$ second, $\frac{1}{60}$ second, $\frac{1}{120}$ second, $\frac{1}{240}$ second, etc.).

FIG. 2A illustrates an example multi-pixel light modulator (110-4), in accordance with an embodiment. Example components of the multi-pixel light modulator (110-4) include, but are not limited to, a shutter (204), a lens (202), a control mechanism (not shown) configured to control one or more of the shutter (204) and the lens (202), etc. Additional mechanical, electrical, optical, electro-optical components, including but not limited to quantum dots, can be added to the multi-pixel light modulator (110-4) in various embodiments.

The multi-pixel light modulator (110-4) may further comprise an LCD-based light modulation component (e.g., layer, etc.). The LCD component can have a lens element to expand or shrink the area of a multi-pixel portion (of a light receiving surface) illuminated by the multi-pixel light modulator (110-4).

FIG. 2B illustrates an example multi-pixel light modulator (110-5), in accordance with an embodiment. A plurality of transmittance levels can be set for a multi-pixel light modulator that comprises a liquid crystal layer with different liquid crystal (e.g., twist) states. Example components of the multi-pixel light modulator (110-5) include, but are not limited to: substrates (254-1 and 254-2), a liquid crystal layer (252), a control and driving mechanism (not shown) configured to drive liquid crystal materials in the liquid crystal layer (252) into various twist states resulting in various optical transparency levels, etc. Additional mechanical, electrical, optical, electro-optical components, including but not limited to quantum dots, can be added to the multi-pixel light modulator (110-5) in various embodiments.

One or more MEMS devices can be configured for one or more multi-pixel light modulators (e.g., 110-4, 110-5, etc.) to control focal lengths, liquid crystal states, aperture values, PWM settings, etc., of the one or more multi-pixel light modulators (e.g., 110-4, 110-5, etc.). Additionally, optionally, or alternatively, switching elements (e.g., active matrix circuitry for controlling the multi-pixel light modulators or components therein) can be configured for multi-pixel light modulators (e.g., 110-4, 110-5, etc.) to control focal lengths, liquid crystal states, aperture values, PWM settings, etc., of the multi-pixel light modulators (e.g., 110-4, 110-5, etc.). The MEMS devices and/or switching elements can be placed in locations that do not affect light recycling or transmission. For example, MEMS devices and/or control circuitry can be embedded within a light reflective component, or placed on an outside surface of a light reflector (108) in between multi-pixel light modulators.

A multi-pixel light modulator (e.g., 110-4, 110-5, etc.) can be embedded with, or mounted in, a light reflective component (206) that is configured to give a light reflective surface (e.g., 106-1). In some embodiments, when the multi-pixel light modulator (110-4, 110-5, etc.) is placed in a dark state and hence does not allow light to exit through the multi-pixel light modulator (110-4, 110-5, etc.), the blocked light may be recycled, for example, by a highly reflective inner surface of the shutter (204), by a reflective optical configuration (e.g., using a combination of polarizers), etc. In some other embodiments, when the multi-pixel light modulator (110-4) is placed in such a dark state, at least a part of the blocked light can be absorbed, for example, by a light absorbing inner surface of the shutter (204), by a light absorbing optical configuration, etc.

A multi-pixel light modulator (e.g., 110-4, 110-5, etc.) as described herein may or may not be manufactured separately from a component in which the multi-pixel light modulator (e.g., 110-4, 110-5, etc.) is embedded with. In some embodiments, at least a part of a multi-pixel light modulator (e.g., 110-4, 110-5, etc.) is manufactured with a light reflective component (e.g., 206) in a single integrated manufacturing process. In some other embodiments, a multi-pixel light modulator (e.g., 110-4, 110-5, etc.) and a light reflective component (e.g., 206) in which the multi-pixel light modulator (e.g., 110-4, 110-5, etc.) is embedded are manufactured separately in separate manufacturing processes.

4. TRANSMITTANCE STATES

The amount of light extracted by a multi-pixel light modulator from the light reflector may be regulated by setting the multi-pixel light modulator to any one of a plurality of different transmittance states. The plurality of different transmittance states may comprise at least two transmittance states (e.g., a dark state that disallows light transmission and a bright state that allows a maximum amount of light transmission, etc.).

FIG. 3 illustrates example transmittance states comprising various combinations of shutter states and transmittance levels, in accordance with an embodiment. The plurality of different transmittance states can be uniquely identified and correspond to respective combinations of (1) shutter states with on/off control types and (2) a plurality of two, three or more transmittance levels. Examples of transmittance states include but are not limited to any of: an off state (a dark state), a fully on state (a bright state), or zero or more intermediate states (e.g., in between the dark state and the bright state, etc.). As used herein, the term "shutter" may refer to any control mechanism that is configured to either allow or forbid light transmission through a multi-pixel light modulator. In some embodiments, a shutter may refer to a mechanical or electro-mechanical (MEMS) component similar to one used in a camera. In some embodiments, a shutter may refer to a liquid crystal state together with light polarization films that are configured to either allow or forbid light transmission through a multi-pixel light modulator.

In some embodiments, a multi-pixel light modulator may comprise quantum dots that regenerate specific color light and/or color filters of specific colors. In these embodiments, a transmittance state may further comprise a component field identifying specific colors that the multi-pixel light modulator is configured to emit.

Transmittance levels of a multi-pixel light modulator as described herein at a light exit point can be set with a pulse-width-modulation (PWM) control. For example, the PWM control can be configured to allow light transmission through the multi-pixel light modulator at the light exit point for a specific time duration in a plurality of possible time durations, for example, within an image frame time.

Transmittance levels can be set with one or more of a variety of control methods. For example, transmittance levels of a multi-pixel light modulator as described herein at a light exit point can be set with an aperture-based control. For example, the aperture-based control can be configured to allow light transmission through a specific size in a plurality of possible sizes of one or more spatial openings in the multi-pixel light modulator at the light exit point.

Additionally, optionally, or alternatively, a multi-pixel light modulator may comprise a light modulation layer such as a liquid crystal layer. Transmittance levels of the multi-pixel light modulator as described herein at a light exit point can be set with the liquid crystal state control. For example, the liquid crystal state control can be configured to allow light transmission with a particular liquid crystal state in a plurality of possible liquid crystal states in the multi-pixel light modulator at the light exit point.

Additionally, optionally, or alternatively, a multi-pixel light modulator may comprise an optic-mechanical device such as a variable focal lens (for example, a zoom lens). Transmittance levels of the multi-pixel light modulator as described herein at a light exit point can be set with an optic-mechanical control. For example, the optic-mechanical control can be configured to allow light transmission with a particular light collection capability in a plurality of possible light collection capabilities in the multi-pixel light modulator at the light exit point.

5. LIGHT DIRECTED MODULATION

Multi-pixel light modulators (e.g., 110-1, 110-2, 110-3, ..., 110-i, ..., etc.) can be configured to provide uniform or non-uniform lighting or illumination on a light receiving surface (e.g., 120) based on particular display operations and/or image data. In some embodiments, this may be done with setting, collectively or individually, sizes of apertures in the multi-pixel light modulators (110-1, 110-2, 110-3, ..., 110-i, ..., etc.), using lenses on top of the apertures to focus light or illumination in a specific area and/or direction, or setting, collectively or individually, transmittance levels of the multi-pixel light modulators (110-1, 110-2, 110-3, ..., 110-i, ..., etc.).

In some embodiments, concave mirrors can be embedded with a surface of the light reflector to direct light into the multi-pixel light modulators. The surface may be opposite to the multi-pixel light modulators. In some embodiments, each multi-pixel light modulator in the plurality of multi-pixel light modulators corresponds to an individual concave mirror in a plurality of concave mirrors embedded in the surface of the light reflector. Curvatures of the concave mirrors can be configured in a manner that focuses light onto their corresponding multi-pixel light modulators. In some embodiments, the concave mirrors may be disposed in a surface (e.g., 106-2) opposite to the surface (e.g., 106-1) in which the multi-pixel light modulators (110-1, 110-2, 110-3, . . . , 110-$i$, . . ., etc.) are embedded.

Figure 4:
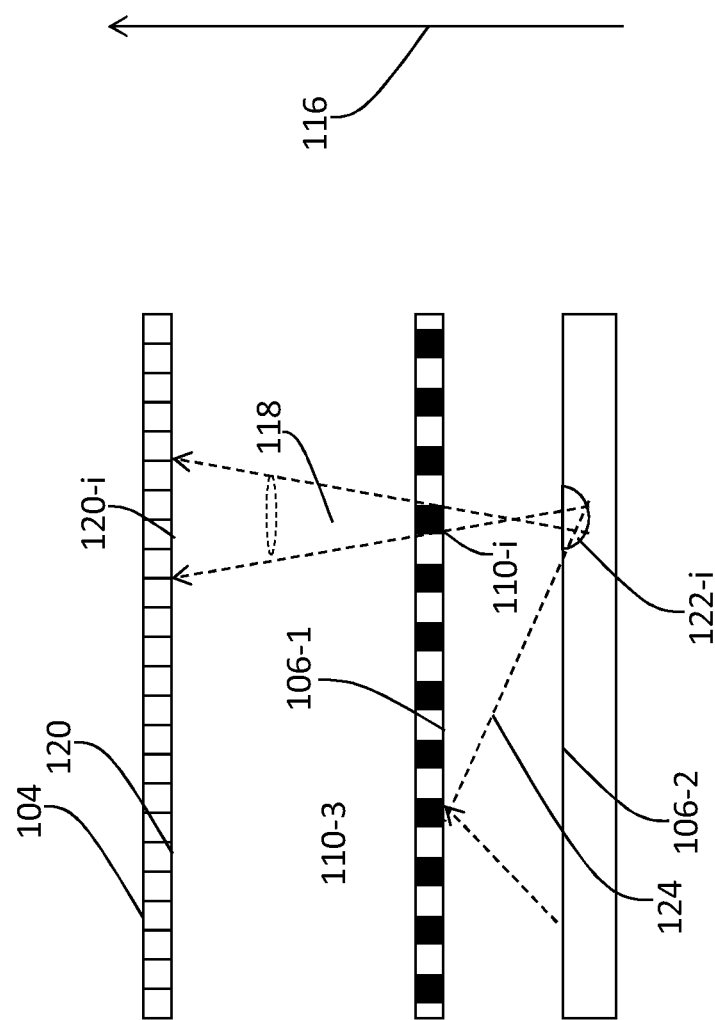
FIG. 4 illustrates an example concave mirror configured to direct light into a multi-pixel light modulator, in accordance with an embodiment.

FIG. 4 illustrates an example concave mirror (122-$i$) configured to direct light into a multi-pixel light modulator (110-$i$), in accordance with an embodiment. As illustrated in FIG. 4, a light ray (124), which otherwise may be reflected further, can be directed by the concave mirror (122-$i$) into the multi-pixel light modulator (110-$i$).

Amounts of light transmitted by individual multi-pixel light modulators (110-1, 110-2, 110-3, . . . , 110-$i$, . . ., etc.) can be controlled based on image data of one or more images to be rendered on the display panel. The amount of light transmitted by a specific individual multi-pixel light modulator may be dependent on the number of multi-pixel light modulators that are in non-dark states (e.g., any states other than the dark state or the off state) and/or the distance of the specific individual multi-pixel light modulator. Accordingly, setting a transmittance state of a specific individual multi-pixel light modulator may take into consideration the number of multi-pixel light modulators that are concurrently in non-dark states and/or the distance of the specific individual multi-pixel light modulators concurrently in non-dark states.

Based on the spatial distribution of multi-pixel light modulators that are in non-dark states, a light field on a surface illuminated by light transmitted from the multi-pixel light modulators may be calculated. Light field calculations may be performed based on (e.g., geometric, optical, liquid crystal, etc.) parameters related to the light reflector and individual multi-pixel light modulators. Characteristics of a light field portion contributed from an individual multi-pixel light modulator may be defined with a lookup table or function, for example. One or more light modulation algorithms can be configured to determine transmittance states of multi-pixel light modulators based at least in part on the parameters, lookup tables or functions.

The one or more light modulation algorithms can be configured to channel light only where it is needed. For bright image features, more light will be directed, for example, by increasing the density and/or transmittance levels of multi-pixel light modulators in non-dark states that are configured to illuminate pixels that represent the bright image features. For dark or dim image features, less or no light will be directed, for example, by decreasing the density and/or transmittance levels of multi-pixel light modulators in non-dark states that are configured to illuminate pixels that represent the dark or dim image features. Thus, light or optical energy is not wasted when displaying images comprising both non-bright image features as well as bright image features.

For the purpose of illustration only, if only one multi-pixel light modulator is open (or in the bright state), and if total light from the light reflector is 1000 nits, then all 1000 nits or a major portion (with a safety margin or allowance for possible loss) of 1000 nits will exit that multi-pixel light modulator. On the other hand, if all multi-pixel light modulators are open, and if the light source (e.g., in which a multi-pixel light modulator is in either the dark state or the bright state, with no other non-dark states) is configured to exit equal light from each multi-pixel light modulator in a non-dark state, then 1000 nits as divided by the number (e.g., 100) of multi-pixel light modulators or a relative portion (with a safety margin or allowance for possible loss) result in 10 nits of light (e.g., 10 nits per multi-pixel light modulator) exiting from each multi-pixel light modulator in a non-dark state.

Therefore, a display system equipped with a light source as described herein may be capable of producing one or more small bright features or an intermediate brightness level full screen. To support the same dynamic range, display systems equipped with light sources that do not implement the techniques as described herein would have to be designed with significantly more power in relation to the light source that implements the techniques as described herein.

6. FILL FACTORS

A light source as described herein may or may not comprise active light emitters in a large fill factor configuration. Any of a variety of active light emitter configurations including but not limited to low or very low fill factor active light emitter configurations can be used with a light source as described herein. Once emitted from the active light emitters, light may be reflected, diffused, and even regenerated (e.g., through quantum dots) throughout the light reflector to result in a relative uniform distribution of optical energy inside the light source.

Accordingly, a light source as described herein may be implemented with a low fill factor. For example only a relatively small number of active light emitters may be needed to produce the same peak brightness in one or more small features in comparison with light sources under other approaches.

A variety of light dispersion and/or light guiding techniques—including but not limited to any of: quantum dots, lens elements or arrays, top or bottom light directing surface features (e.g., prisms, bumps, gratings, etc.), concave mirrors, etc.—can be used in the light source to provide relatively uniform light or optical energy distribution inside the light source and to support relatively low fill factor, one-to-many local dimming in a display system. As used herein, the term "fill factor" may refer to a quantity representable with a ratio of the number of active light emitters over the number of pixels of a display panel. A low fill factor may refer to a ratio value below one of 25%, 20%, 15%, 10%, 5%, 1%, 0.1%, etc. The term "one-to-many local dimming" may mean that a pixel of a display panel or a portion of a light receiving surface is illuminated simultaneously or accumulatively by light from many multi-pixel light modulators.

The low-fill factor, one-to-many local dimming techniques as described herein can be used to reduce or avoid necessity for configuring a large number of active light sources and expensive components configured for each pixel's peak brightness across a full screen in display systems, and can be especially useful for supporting local dimming display operations in small display systems such as mobile devices, as will be further explained.

7. MODULAR CONFIGURATIONS

Figure 5:
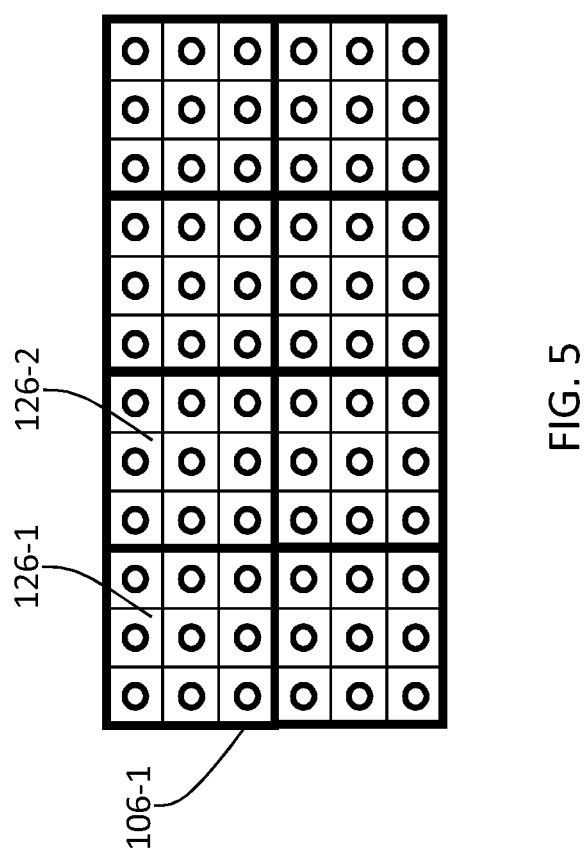
FIG. 5 illustrates example light directed modulation tiles, in accordance with an embodiment.

Techniques as described herein make it easy to use a modular design for the light source, as light from a (e.g., relatively small) number of active light emitters can be distributed smoothly in the light reflector of the light source. FIG. 5 illustrates a plurality of light directed modulation tiles (e.g., 126-1, 126-2, etc.) configured to form a light reflector component (which has a light reflective surface such as 106-1 of FIG. 1A) embedded with a plurality of multi-pixel light modulators (110-1, 110-2, 110-3, . . . , 110-$i$, . . ., etc.), in accordance with an embodiment. The plurality of light directed modulation tiles (126-1, 126-2, etc.) can be used to house their respective multi-pixel light modulators and can be individually replaceable.

Uniformity of lighting in border regions of neighboring light directed modulation tiles and/or neighboring component light sources in an overall light source can be relatively easily supported by the techniques as described herein. For example, to illuminate simultaneously the same portion of a display channel or a light receiving surface by light from two or more multi-pixel light modulators (e.g., 120-$i$ and 120-($i$+1)), two or more light directed modulation tiles (e.g., 126-1 and 126-2) or two or more component light sources, the two or more multi-pixel light modulators (e.g., 120-$i$ and 120-($i$+1)), the two or more light directed modulation tiles (e.g., 126-1 and 126-2) or the two or more component light sources can be configured with light distribution components such as lenses, diffusers, shutters, etc. Uniformity for illuminating a specific image feature can also be improved with additional optical components. For example, light guides can be installed between two or more multi-pixel light modulators, two or more light directed modulation tiles or two or more component light sources to allow a relatively even distribution of light between the multi-pixel light modulators, the light directed modulation tiles or the component light sources.

Thus, in embodiments in which multiple light directed modulation tiles each comprising their own light reflectors and multi-pixel light modulators are used and/or in which multiple component light sources are used to form an overall light source, artifacts such as lines and shadows between neighboring lighting modules, between neighboring component light sources, or caused by on-board circuitry, can be reduced or avoided under techniques as described herein.

Because of the ability of channeling high intensity illumination to small image features of an image without using an excessive amount of light across a whole screen, light sources as described herein are ideally suited to be incorporated into mobile devices to support local dimming display operations on these mobile devices. In some embodiments, a light reflector of a light source for a mobile device can be implemented as a sheet of light guides with light reflective surfaces and light exit points through a plurality of multi-pixel light modulators. Light can be injected into the light guide through a direct-lit or side-lit configuration (e.g., in a thin-thickness form) by active light emitters.

Figure 1C:
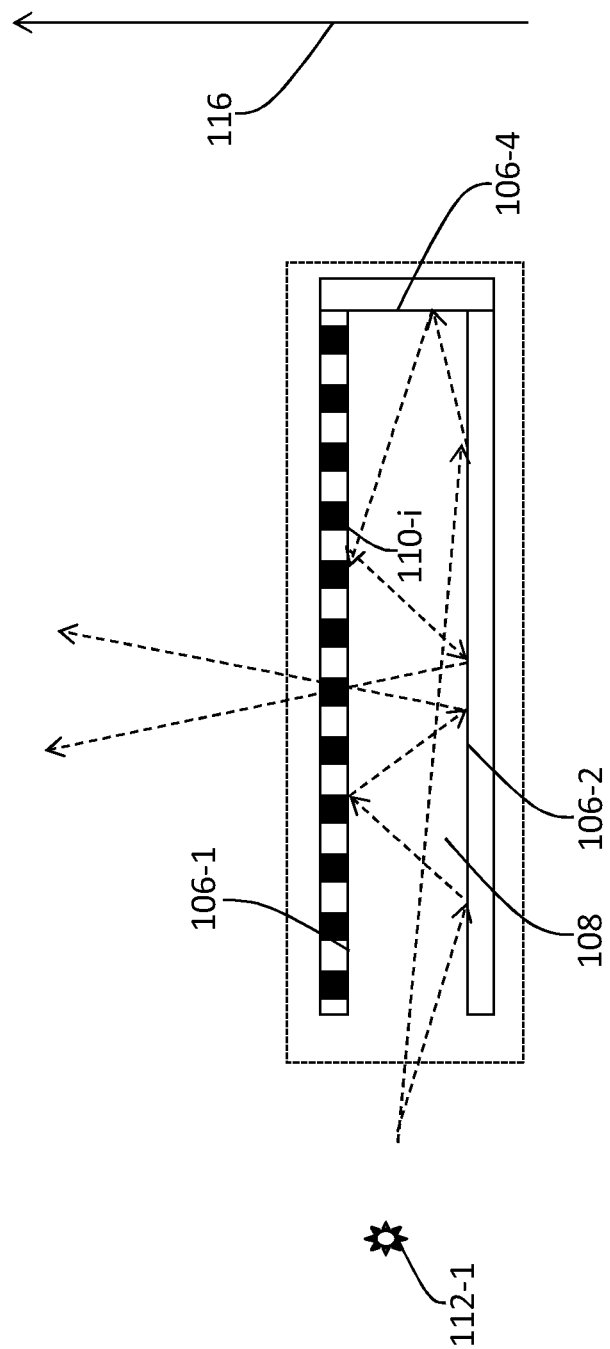
Figure 1D:
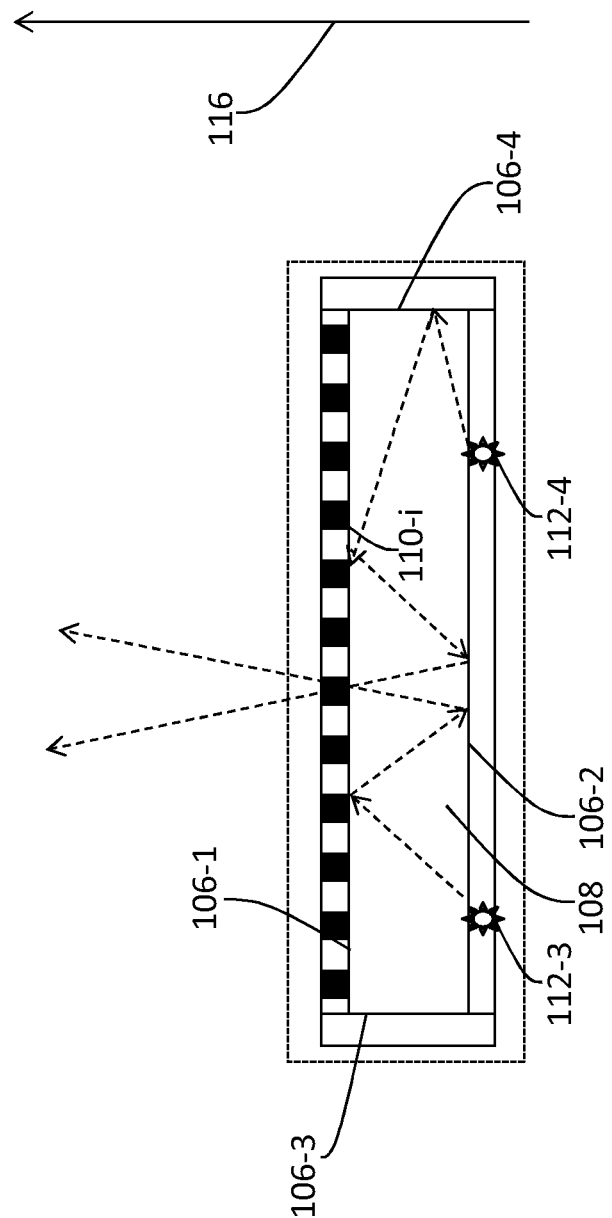

FIG. 1C illustrates an example side-lit configuration in which light can be injected by one or more active light emitters (one of which may be 112-1) into a light reflector (e.g., 108) of a light source (e.g., 102 of FIG. 1A). FIG. 1D illustrates an example direct-lit configuration in which light can be injected by one or more active light emitters (which may be 112-2, 112-3, etc.) into a light reflector (e.g., 108) of a light source (e.g., 102 of FIG. 1A).

The light reflector can have a thickness as thin as a few millimeters or even sub-millimeters. The thickness can be represented by the distance between a first light reflective component that provides the light reflective surface 106-1 and a second light reflective component that provides the light reflective surface 106-2. In some embodiments, one or more light reflective components providing light reflective surfaces (e.g., 106-3) are removed to form a light reflective region that may not be totally enclosed.

Modularized side-lit and/or direct-lit light sources that form a single overall light source may be optically linked with one or more light guides or other light directing mechanisms that are configured to distribute or direct light between the modularized light sources. For example, a modularized light source may comprise light directing components, to another modularized light source, including but not limited to optical fibers to distribute or direct light between the modularized light sources.

8. EXAMPLE DISPLAY SYSTEM

A display system as described herein can be configured to drive multi-pixel light modulators in a light source based on image data. Local drive values of the multi-pixel light modulators can be obtained based on local analysis of corresponding pixels (e.g., corresponding to a portion of a light receiving surface illuminated by the light source) in the image data. The local drive values may also be adjusted based on an overall brightness level of an image and/or drive values of neighboring multi-pixel light modulators. In some embodiments, the display system can be configured to drive active light emitters that inject light into a light reflective region before exiting through the multi-pixel light modulators in an amount commensurate with what is needed for image rendering, including but not limited to a possible safety margin. Thus, total light output from the light source provides accurate brightness levels for image features based on the received image data. Thus, a display system as described herein can be configured to operate in a way that reduces energy consumption and heat dissipation while maintaining support for high dynamic range and wide color gamut display operations.

Figure 6:
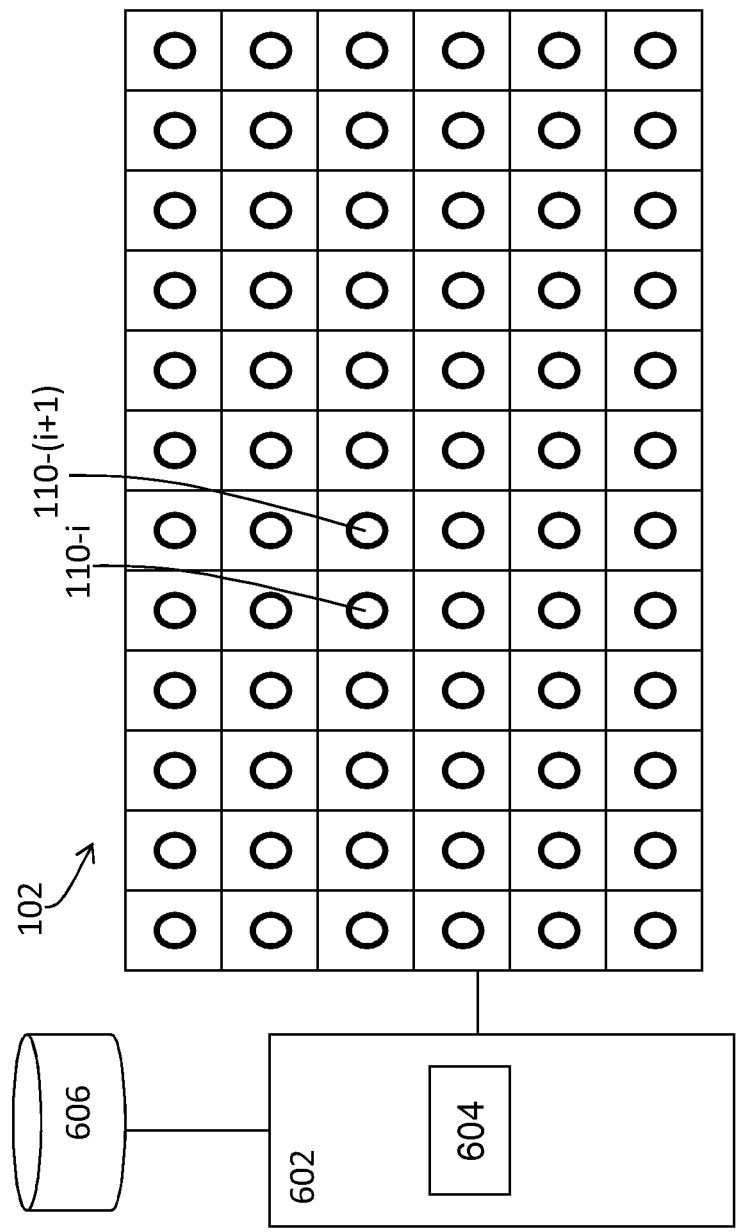
FIG. 6 illustrates an example display system comprising a light source controller and a light directed modulation light source, in accordance with an embodiment.

FIG. 6 illustrates an example display system comprising a light source controller (602) and a light directed modulation light source (e.g., 102 of FIG. 1), in accordance with an embodiment. Light source controller 602 can be configured to control multi-pixel light modulators in the light source (102). The light source controller 602 can be operatively coupled to the light source (102). The light source controller (602) is operatively coupled with an image data source (606) and is configured to receive image data from the image data source (606). In some embodiments, the light source controller (602) can be configured to receive a down-sampled version of images in the image data from the image data source (606); the down-sampled version of the images may be of a lower resolution than the resolutions of the images as provided by the image data source (606). The image data can be provided by the image data source (606) to the display system in a variety of ways including from over-the-air broadcast, a set-top box, a networked server coupled to the display system, and/or a storage medium. The light source controller (602) may comprise multi-pixel light modulator control module (304) that implements one or more light modulation algorithms to set transmittance states of the multi-pixel light modulators in the light source (102) based on the image data.

A display system as described herein can be used to support high dynamic range (HDR) display operations. For example, high intensity light can be directed to bright image features such as a bright image feature (e.g., highlight) off a glass surface. Rendering of small bright features in a rendered image together with less bright image features add to realism, as many images may only contain a limited number of bright image features that are far from covering the whole screen. Since a light source as described herein may, but is not required to, be configured with a full screen high illumination intensity, the light source generates much less heat than other approaches that incur a large amount of light loss in HDR display operations. Thus, a light source as described herein can be configured to support light directed modulation in which light is channeled or directed to image features of a variety of brightness levels in various amounts (which may be optionally added with some safety margins) that match the respective brightness levels of the image features to be rendered.

A display system or a light source controller (e.g., 602) therein can set transmittance states of multi-pixel light modulators based on image data. Depending on the size and the brightness level of an image feature, one, two or more multi-pixel light modulators can be turned on to illuminate the image feature. Light modulation algorithms implemented by the light source controller (602) can be used to set transmittance states of neighboring multi-pixel light modulators in the same modulation tile of a light source, in different modulation tiles of the same light source, or in two or more different component light sources so that light from these neighboring multi-pixel light modulators overlap on a light receiving surface for the purpose of reducing or removing artifacts of lines and shadows unrelated to the image data.

If an image is relatively bright, the rendering of the image may consume a relatively large amount of light. On the other hand, if an image is relatively dark, the rendering of the image may only consume a relatively small amount of light.

Active light emitters can be controlled by a light source controller (e.g., 602) to inject a variable amount of light into a light source. Light leaks (e.g., light that is not used for image rendering) can be configured with a light source. Light exit points and/or light absorbing components (e.g., on a side surface, a back surface, a bottom surface, etc.) can be configured with the light source to allow unused light to leak out from the light source. Both active light emitters with adjustable light output and light leaks can be used together in a light source.

One or more of LCD transmittance levels, PWM controls, apertures, modulation algorithms, image data, etc., can be controlled by a light source control module to produce an amount of light that is proportional to the overall brightness level of an image being rendered. Thus, if an image needs 250 nits to render, and if light produced by a light source (or light injected by active light emitters) is 1000 nits, then 250 nits can be reduced by or leaked from the light source in rendering the image.

Active light emitters that are directly placed in the light reflector of a light source or side-placed with respect to the light reflector can be monochrome light emitters, color light emitters, or any combination of the foregoing. Light converters such as quantum dots can be placed in the light source to convert light of one wavelength or wavelength range to a different wavelength or wavelength range. Thus, active light emitters may inject light of a certain color combination (e.g., a specific set of relative color light intensities). Optionally, light converters can be used to alter the certain color combination to a different color combination (e.g., a different set of relative color light intensities). Light converters such as quantum dots can be placed in one or more of a variety of different locations in the light source, for example, with the active light emitters, with a bottom light reflective surface, with a top light reflective surface, with a side light reflective surface, with one or more components of a multi-pixel light modulator, with a color filter, with a standalone layer, etc. Different types of light converters may also be used. For example, a reflective sheet can be coated with quantum dots to generate blue light from invisible light.

One or more light modulation algorithms can be configured to modulate luminance or a specific set of colors in light transmitted through multi-pixel light modulators of a light source. The modulation algorithms can be configured to use a set of input parameters to determine output parameters that control the light source to generate a specific light field for rendering an image. Example input parameters used by the modulation algorithms include, but are not limited to any of: parameters or states related to active light emitters, geometry of the light reflector, density of multi-pixel light modulators, internal light loss, image data, settable aperture values, settable liquid crystal states, settable focal lengths, point spread functions of multi-pixel light modulators, sizes of illumination areas, downstream modulation layers, intensity of each color light, etc. Example output parameters include, but are not limited to any of: parameters or control values related to transmittance states of the multi-pixel light modulators, specific controls of various optical, electric, mechanical components, etc. The light field (e.g., on a downstream modulation layer) generated by the light source may include safety margins and may be further modulated by other modulation algorithms that control one or more downstream modulation layers. The other modulation algorithms can set pixel-level or multi-pixel-level controls for the downstream modulation layers based at least in part on the light field generated by the light source.

The modulation algorithms can be configured to divide an illuminated area on a downstream modulation layer into a plurality of blocks. Illumination on each of these blocks by the light source can be individually controlled by the modulation algorithms. Examples of blocks may include, but are not limited to, squares comprising multiple pixels. The blocks may or may not be overlapped. Temporal dithering and/or spatial dithering techniques can be used to create multiple gray levels and/or uniform/smooth illumination in between neighboring blocks.

9. EXAMPLE PROCESS FLOW

FIG. 7 illustrates an example process flow, in accordance with an embodiment of the present invention. In some embodiments, one or more computing devices or components in a display system comprising display controller 602 and a light source 102 may perform this process flow. In block 702, the display system receives image data for one or more images to be rendered.

In block 704, the display system sets, based on the image data, a plurality of multi-pixel light modulators (e.g., 110-1, 110-2, 110-3, etc.) in the light source 102 to individual transmittance states to modulate light (a) exiting from a light reflector 108 in the light source 102 and (b) illuminating individual multi-pixel portions of a light receiving surface 120.

The light reflector 108 is configured to recycle light incident on one or more light reflective surfaces (e.g., 106-1, 106-2, 106-3, etc.) within the light reflector 108. The plurality of multi-pixel light modulators (e.g., 110-1, 110-2, 110-3, etc.) is spatially embedded with at least one light reflective surface (e.g., 106-1) of the one or more light reflective surfaces (106-1, 106-2, 106-3, etc.).

In an embodiment, the multi-pixel portions of the light receiving surface correspond to a set of pixels on a display panel; each of the multi-pixel portions of the light receiving surface correspond to two or more pixels on the display panel. As used herein, the term "correspond" may mean that the light illuminated on a multi-pixel portion of the light receiving surface may be further propagated through zero or more optical components to illuminate the two or more pixels. In some embodiments, the light receiving surface is a surface of a display panel comprising the two or more pixels; in these embodiments, the two or more pixels are in the same modulation layer as the multi-pixel portion that corresponds to the two or more pixels.

In an embodiment, at least two neighboring multi-pixel portions share a common portion that corresponds to one or more common pixels of a display panel.

In an embodiment, the light reflector comprises quantum dots in one or more components of the light reflector.

In an embodiment, at least one multi-pixel light modulator in the plurality of multi-pixel light modulators comprises one or more of lenses, shutters, apertures, liquid crystal light valves, mechanical valves, light guides, concave mirrors, or quantum dots.

In an embodiment, light provided to the light reflector is emitted from one or more of side-lit active light emitters or direct-lit active light emitters. The one or more of side-lit active light emitters or direct-lit active light emitters may comprise at least one of: light-emitting diodes (LEDs), cold cathode fluorescent lights (CCFLs), quantum-dot based light converters, organic light-emitting diodes (OLEDs), fluorescent lights, incandescent lights, gas discharge lights, etc.

In an embodiment, at least two multi-pixel light modulators in the plurality of multi-pixel light modulators are configured to illuminate a multi-pixel portion in the individual multi-pixel portions of the light receiving surface with different color light.

In an embodiment, at least one multi-pixel light modulator in the plurality of multi-pixel light modulators is configured to illuminate a multi-pixel portion in the individual multi-pixel portions of the light receiving surface with one or more selected spectral ranges of light wavelengths.

In an embodiment, a maximum intensity of light illuminating on a portion of the light receiving surface within an image frame time is proportional to a number of multi-pixel light modulators simultaneously illuminating the portion within the image frame time.

In an embodiment, the light receiving surface comprises one or more of rectangular shapes, polygonal shapes, curved shapes, spherical shapes, concave shapes, convex shapes, irregular shapes, or disjoint shapes.

In an embodiment, the plurality of multi-pixel light modulators is divided into one or more separately installable modules.

In an embodiment, light illuminating on a first portion of the light receiving surface within an image frame time is no more than 30 nits, while light illuminating on a second different portion of the light receiving surface within the same image frame time exceeds one of 30 nits, 100 nits, 500 nits, 1000 nits, or more.

In an embodiment, a portion of the light receiving surface is configured to be simultaneously within an image frame time illuminated by light directed by one or more multi-pixel light modulators; light intensity on the portion is configured to be controlled with one or more of: adjusting light transmittance states of the one or more multi-pixel light modulators, adjusting a spatial density of the one or more multi-pixel light modulators that are in non-dark transmittance states, adjusting time durations of illumination from the one or more multi-pixel light modulators, adjusting light directions by the one or more multi-pixel light modulators, etc.

In an embodiment, the at least one light reflective surface in the one or more light reflective surfaces comprises a plurality of light illumination modules; each illumination module comprises one or more multi-pixel light modulators in the plurality of multi-pixel light modulators.

In an embodiment, the light source is a part of a handheld display device, a tablet computing device, a television system, a theater-based display system, an outdoor display system, etc.

In an embodiment, a light reflective surface in the one or more light reflective surfaces comprises a plurality of concave mirrors.

In an embodiment, a light reflective surface in the one or more light reflective surfaces comprises one or more of: reflective metallic surfaces, total internal reflection (TIR) surfaces, substrates, optical films, optical reflective enhancement films, reflective liquid crystal layers, e-papers, other light reflective materials, etc.

In an embodiment, each multi-pixel light modulator in a non-dark transmittance state emits an equal amount of light as any of other multi-pixel light modulators in non-dark transmittance states.

In an embodiment, at least two multi-pixel light modulators in non-dark transmittance states emit two different amounts of light.

In an embodiment, a display system comprising the light source is configured to vary a total amount of input light injected into the light reflector by one or more active light emitters based on an overall brightness level of an image to be rendered by the display system.

In an embodiment, the light source is configured with one or more light leaks or light absorbing components to remove, based on an overall brightness level of an image to be rendered, a portion of a total amount of input light injected into the light reflector by one or more active light emitters.

Embodiments include an apparatus comprising a processor and configured to perform any one of the foregoing methods.

Embodiments include a computer readable storage medium, storing software instructions, which when executed by one or more processors cause performance of any one of the foregoing methods.

10. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
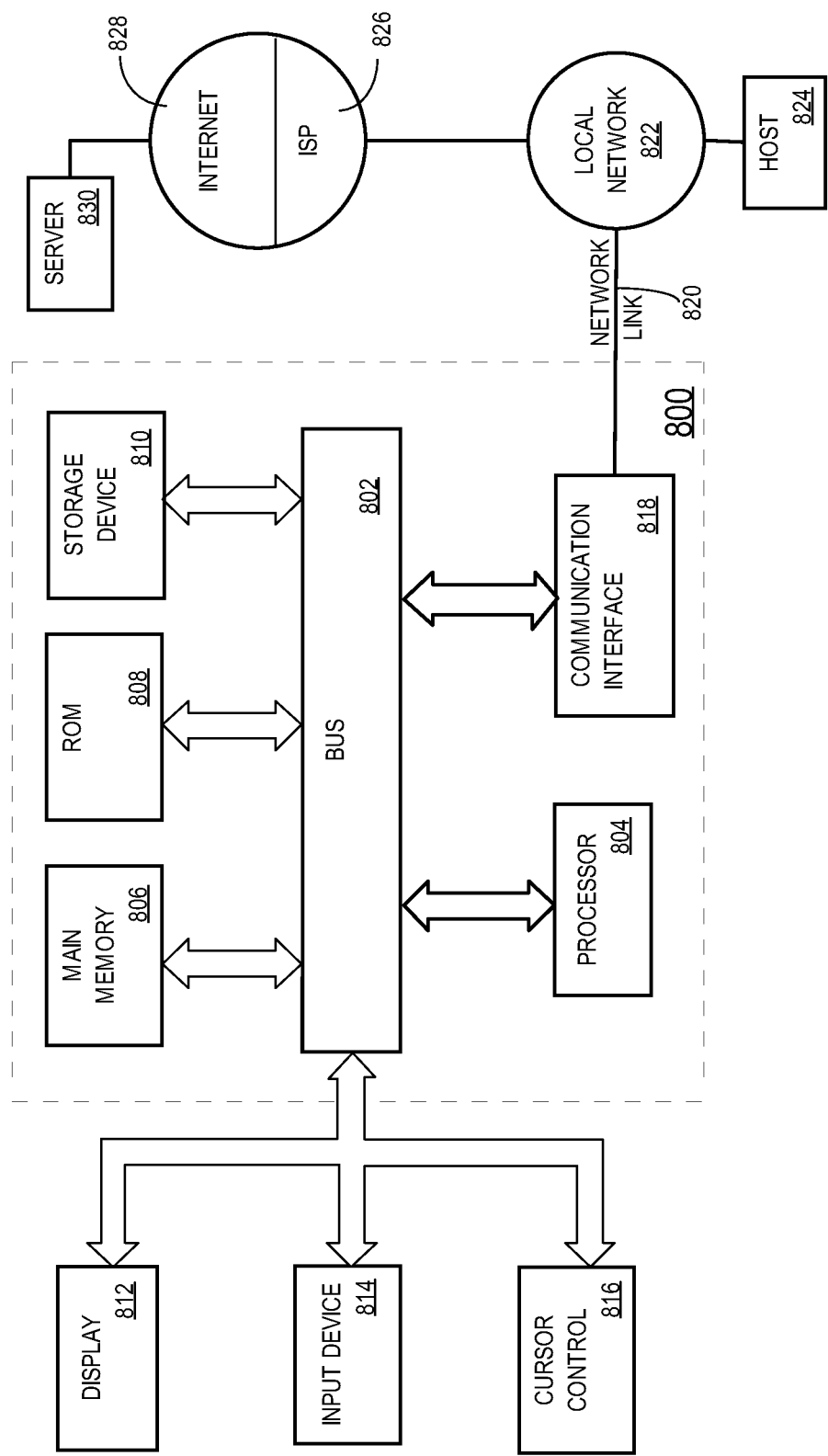
FIG. 8 illustrates an example hardware platform on which a computer or a computing device as described herein may be implemented, in accordance with an embodiment.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also can be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry can be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

11. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

I claim:

1. A light source, comprising:
a light reflector surrounded with one or more light reflective surfaces, the light reflector being configured to recycle light incident on the one or more light reflective surfaces within the light reflector; and
a plurality of multi-pixel light modulators configured to be set to individual transmittance states based on image data to modulate light (a) exiting from the light reflector and (b) illuminating individual multi-pixel portions of a light receiving surface, the plurality of multi-pixel light modulators being spatially embedded with at least one light reflective surface of the one or more light reflective surfaces,
wherein at least two neighboring multi-pixel portions share a common portion that corresponds to one or more common pixels of a display panel.

2. The light source of claim 1, wherein the multi-pixel portions of the light receiving surface correspond to a set of pixels on a display panel, and wherein each of the multi-pixel portions of the light receiving surface correspond to two or more pixels on the display panel.

3. The light source of claim 1, wherein the light reflector comprises quantum dots in one or more components of the light reflector.

4. The light source of claim 1, wherein at least one multi-pixel light modulator in the plurality of multi-pixel light modulators comprises at least one of: lenses, shutters, apertures, liquid crystal light valves, mechanical valves, light guides, concave mirrors, or quantum dots.

5. The light source of claim 1, wherein light provided to the light reflector is emitted from at least one of: side-lit active light emitters or direct-lit active light emitters.

6. The light source of claim 1, wherein light provided to the light reflector is emitted from at least one of: light-emitting diodes (LEDs), cold cathode fluorescent lights (CCFLs), quantum-dot based light converters, organic light-emitting diodes (OLEDs), fluorescent lights, incandescent lights, or gas discharge lights.

7. The light source of claim 1, wherein at least two multi-pixel light modulators in the plurality of multi-pixel light modulators are configured to illuminate a multi-pixel portion in the individual multi-pixel portions of the light receiving surface with different color light.

8. The light source of claim 1, wherein at least one multi-pixel light modulator in the plurality of multi-pixel light modulators is configured to illuminate a multi-pixel portion in the individual multi-pixel portions of the light receiving surface with one or more selected spectral ranges of light wavelengths.

9. The light source of claim 1, wherein a maximum intensity of light illuminating on a portion of the light receiving surface within an image frame time is proportional to a number of multi-pixel light modulators simultaneously illuminating the portion within the image frame time.

10. The light source of claim 1, wherein the light receiving surface comprises at least one of: rectangular shapes, polygonal shapes, curved shapes, spherical shapes, concave shapes, convex shapes, irregular shapes, or disjoint shapes.

11. The light source of claim 1, wherein the plurality of multi-pixel light modulators is divided into one or more separately installable modules.

12. The light source of claim 1, wherein light illuminating on a first portion of the light receiving surface within an image frame time is no more than 30 nits, and wherein light illuminating on a second different portion of the light receiving surface within the same image frame time exceeds one of 30 nits, 100 nits, 500 nits, or 1000 nits.

13. The light source of claim 1, wherein a portion of the light receiving surface is configured to be simultaneously within an image frame time illuminated by light directed by one or more multi-pixel light modulators, and wherein light intensity on the portion is configured to be controlled with at least one of: adjusting light transmittance states of the one or more multi-pixel light modulators, adjusting a spatial density of the one or more multi-pixel light modulators that are in non-dark transmittance states, adjusting time durations of illumination from the one or more multi-pixel light modulators, or adjusting light directions by the one or more multi-pixel light modulators.

14. The light source of claim 1, wherein the at least one light reflective surface in the one or more light reflective surfaces comprises a plurality of light illumination modules, and wherein each illumination module comprises one or more multi-pixel light modulators in the plurality of multi-pixel light modulators.

15. The light source of claim 1, wherein the light source is a part of: a handheld display device, a tablet computing device, a personal computing device, a television system, a theater-based display system, or an outdoor display system.

16. The light source of claim 1, wherein a light reflective surface in the one or more light reflective surfaces comprises a plurality of concave mirrors.

17. The light source of claim 1, wherein a light reflective surface in the one or more light reflective surfaces comprises at least one of: reflective metallic surfaces, total internal reflection (TIR) surfaces, substrates, optical films, optical reflective enhancement films, reflective liquid crystal layers, e-papers, or other light reflective materials.

18. The light source of claim 1, wherein each multi-pixel light modulator in a non-dark transmittance state emits an equal amount of light as any of other multi-pixel light modulators in non-dark transmittance states.

19. The light source of claim 1, wherein at least two multi-pixel light modulators in non-dark transmittance states emit two different amounts of light.

20. The light source of claim 1, wherein a display system comprising the light source is configured to vary a total amount of input light injected into the light reflector by one or more active light emitters based on an overall brightness level of an image to be rendered by the display system.

21. The light source of claim 1, wherein the light source is configured with one or more light leaks or light absorbing components to remove, based on an overall brightness level of an image to be rendered, a portion of a total amount of input light injected into the light reflector by one or more active light emitters.

22. The light source of claim 1, wherein the light source is configured with one or more light diffusion elements to disperse input light injected into the light reflector by a specific number of active light emitters throughout the light reflector, wherein the specific number of active light emitters represents a fraction of a total number of pixels in the display system, and wherein the fraction is represented by one of 25%, 20%, 15%, 10%, 5%, 1%, or 0.1%.

23. A method comprising:
receiving image data for one or more images to be rendered in a display system, a light source of the display system having a light reflector comprising one or more light reflective surfaces and a plurality of multi-pixel light modulators; and
setting, based on the image data, the plurality of multi-pixel light modulators to individual transmittance states to modulate light (a) exiting from the light reflector and (b) illuminating individual multi-pixel portions of a light receiving surface;
wherein the light reflector is configured to recycle light incident on the one or more light reflective surfaces within the light reflector,
wherein the plurality of multi-pixel light modulators being spatially embedded with at least one light reflective surfaces of the one or more light reflective surfaces, and
wherein at least two neighboring multi-pixel portions share a common portion that corresponds to one or more common pixels of a display panel.

24. The method of claim 23, wherein the multi-pixel portions of the light receiving surface correspond to a set of pixels on a display panel, and wherein each of the multi-pixel portions of the light receiving surface correspond to two or more pixels on the display panel.

25. The light source of claim 23, wherein the light source is configured with one or more light diffusion elements to disperse input light injected into the light reflector by a specific number of active light emitters throughout the light reflector, wherein the specific number of active light emitters represents a fraction of a total number of pixels in the display system, and wherein the fraction is represented by one of 25%, 20%, 15%, 10%, 5%, 1%, or 0.1%.

26. The method of claim 23, wherein at least two multi-pixel light modulators in the plurality of multi-pixel light modulators are configured to illuminate a multi-pixel portion in the individual multi-pixel portions of the light receiving surface with different color light.

27. The method of claim 23, wherein light illuminating on a first portion of the light receiving surface within an image frame time is no more than 30 nits, and wherein light illuminating on a second different portion of the light receiving surface within the same image frame time exceeds one of 30 nits, 100 nits, 500 nits, 1000 nits.

28. The method of claim 23, wherein a portion of the light receiving surface is configured to be simultaneously within an image frame time illuminated by light directed by one or more multi-pixel light modulators, and wherein light intensity on the portion is configured to be controlled with at least one of: adjusting light transmittance states of the one or more multi-pixel light modulators, adjusting a spatial density of the one or more multi-pixel light modulators that are in non-dark transmittance states, adjusting time durations of illumination from the one or more multi-pixel light modulators, or adjusting light directions by the one or more multi-pixel light modulators.

29. The method of claim 23, wherein each multi-pixel light modulator in a non-dark transmittance state emits an equal amount of light as any of other multi-pixel light modulators in non-dark transmittance states.

30. The method of claim 23, wherein at least two multi-pixel light modulators in non-dark transmittance states emit two different amounts of light.

31. The method of claim 23, further comprising varying a total amount of input light injected into the light reflector by one or more active light emitters based on an overall brightness level of an image to be rendered.

32. The method of claim 23, further comprising determining an overall light field on the light receiving surface based on the individual transmittance states of the plurality of multi-pixel light modulators.

33. An apparatus comprising a processor and configured to perform the method recited in claim 23.

34. A computer readable storage medium, storing software instructions, which when executed by one or more processors cause performance of the method recited in claim 23.

* * * * *